G. W. KRAMER.
CONCRETE BLOCK MAKING MACHINE.
APPLICATION FILED APR. 8, 1908.
981,929.
Patented Jan. 17, 1911.
3 SHEETS—SHEET 1.
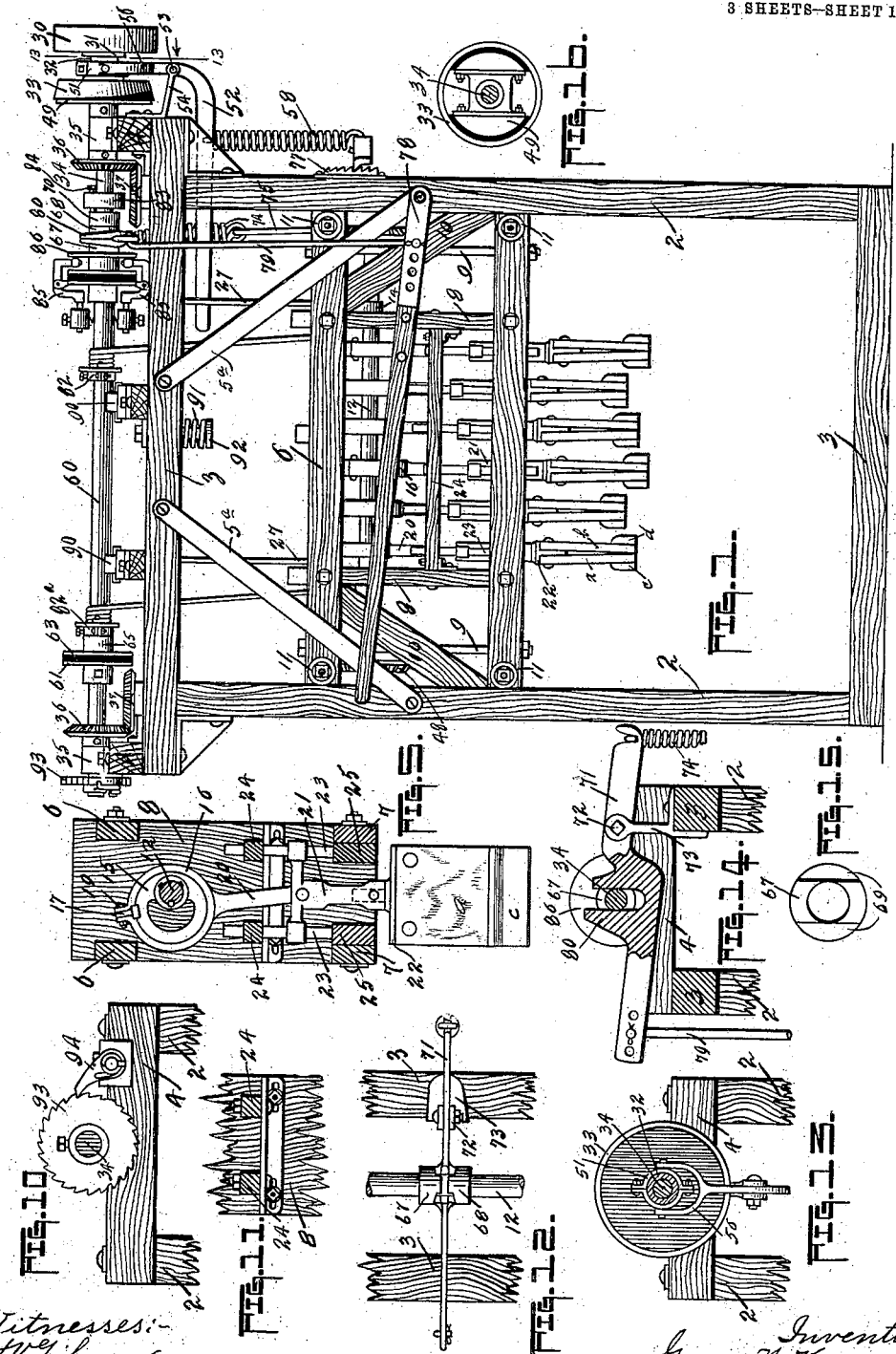
Witnesses:
Inventor,
George W. Kramer
By G. W. KRAMER.
CONCRETE BLOCK MAKING MACHINE.
APPLICATION FILED APR. 8, 1908.
981,929.
Patented Jan. 17, 1911.
3 SHEETS—SHEET 2.
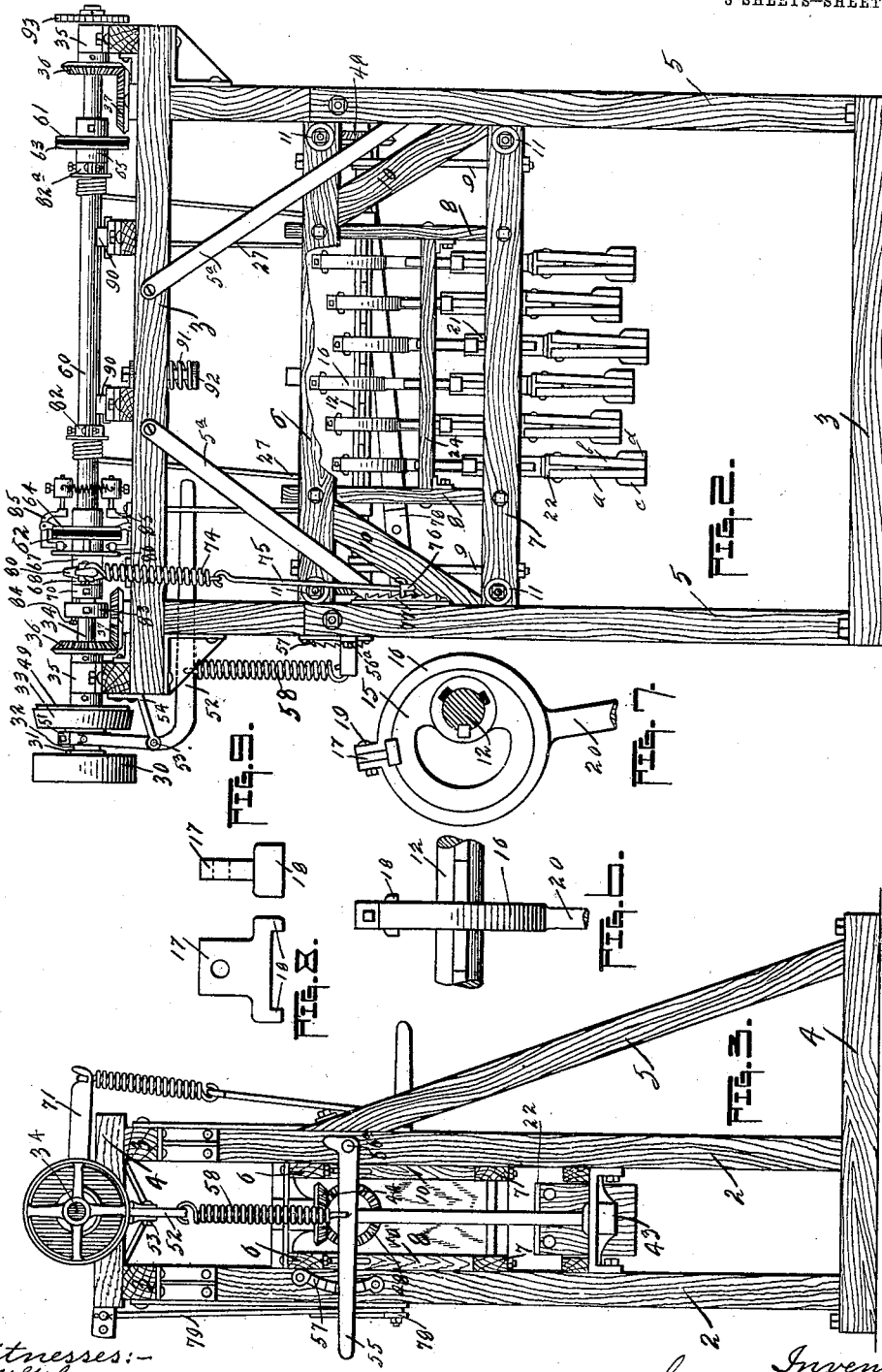

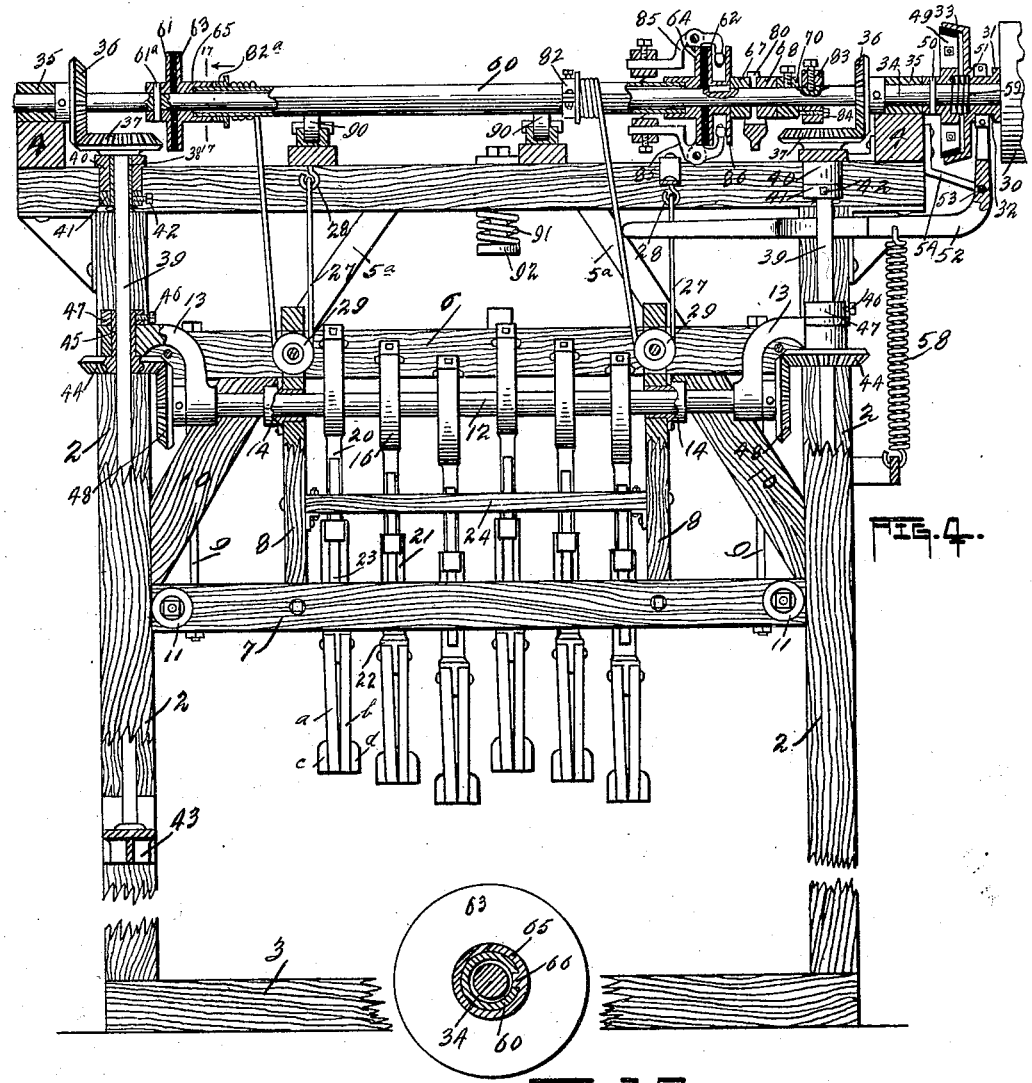

UNITED STATES PATENT OFFICE.

GEORGE W. KRAMER, OF PEORIA, ILLINOIS.

CONCRETE-BLOCK-MAKING MACHINE.

981,929. Specification of Letters Patent. Patented Jan. 17, 1911.

Application filed April 8, 1908. Serial No. 425,850.

*To all whom it may concern:*

Be it known that I, GEORGE W. KRAMER, a citizen of the United States, residing at Peoria, in the county of Peoria and State of Illinois, have invented certain new and useful Improvements in Concrete-Block-Making Machines; and I do hereby declare that the following is a full, clear, and exact description of the invention, which will enable others skilled in the art to which it appertains to make and use the same.

This invention relates to certain new and useful improvements in concrete block making machines, and has special reference to a machine employing a series of tamping devices.

The invention embraces particularly automatic mechanism provided to actuate the tamping devices and to actuate a carriage to and from its work and to detailed mechanism provided to best facilitate the operation of the complete device.

That my invention may be more fully understood, reference is had to the accompanying drawings, in which—

Figure 1 is a front elevation of a machine; Fig. 2 is a rear elevation; Fig. 3 is a side elevation; Fig. 4 is also a front elevation, omitting several of the parts shown in Fig. 1 and showing in section various parts of the machine; Fig. 5 shows detailed parts of the tamping mechanism; Fig. 6 is a detail showing the manner of securing the eccentric rings to a shaft; Fig. 7 is a side elevation of the same subject matter as shown in Fig. 6; Figs. 8 and 9 are respectively a front and side view of a spacing plate provided with lugs; Fig. 10 is a detail view showing a ratchet wheel upon the drive shaft and a pawl adapted to engage the same; Fig. 11 is a detail view showing an adjustable plate adapted to support certain frame parts; Fig. 12 is a detail view showing a combined locking bar and spacer; Fig. 13 is a detail view showing the manner of supporting a friction clutch mechanism; Fig. 14 is a detail view showing the manner of supporting a locking bar; Fig. 15 is a detail view showing a grooved collar; Fig. 16 is a detail view showing the friction clutch and clutch wheel; Fig. 17 is a detail view showing the manner of uniting the sleeve with the collar.

My invention comprises a series of tampers designed in practical use to bear over the concrete block molding machine in position when operated to act upon materials placed within the molds. In the plan of operation, I have designed in the construction herein shown, that the tampers should be arranged to deliver impact force to the material in the mold, and in connection with this arrangement, it is my plan that the tampers shall be operated successively in pairs to simultaneously strike the material, the respective members of each pair being arranged in series at intervals apart with two intermediate tampers between them, but in applying my invention to machines using a smaller or greater number of tampers, this plan may be changed at will without departing from the spirit of my invention.

In the plan for operating the tampers to move up and down, I have shown eccentric devices which I have found to work very successfully and prefer to employ that method. However, I may employ other methods to accomplish that result, as, for instance, by the use of rock arms or equivalent devices.

In the plan of my invention herein shown, I have supported the tampers within a carriage designed to be raised and lowered at the will of the operator to carry the tampers to and from their work, and it is my preferred embodiment of the invention, however, the tampers might be supported vertically stationary and the mold might be moved upwardly and downwardly, also I have shown herein a means for raising and lowering the tamper carriage by windlass and pulley devices, which provides a flexible connection, as distinguished from a rigid one, however, a rigid connection could be employed without departing from my invention. Likewise, I have shown a frictional connection with the power, and it is my preferred form of embodiment of the invention but I may employ other means for connection with the power without departing from the spirit of my invention. Likewise, I have shown indirect means for operating the shaft upon which the tamper eccentrics are carried, and it is my preferred embodiment of invention, but direct means may be applied for accomplishing the same purpose.

Referring particularly to the drawings, I have provided a frame structure for supporting the operative mechanism of my device, comprising the uprights 2 connected at top and bottom of the length by cross pieces 3 and of their width by cross pieces 4.

5 are braces connecting an extension of the cross pieces 4 with the upright frame pieces 2.

5ª are brace bars connecting the frame parts, as shown.

I provide a carriage frame comprising the top frame pieces 6 and bottom frame pieces 7 spaced apart by the end closure pieces as 7ª, there being one provided at each end of the carriage frame, to bear between the upright frame pieces 2, each pair connected by the frame pieces 8 and the rods 9. I provide the diagonally disposed brace bars 10 to strengthen the frame. The frame parts 6 and 7 may be connected in any suitable manner to give them strength.

Anti-friction rollers 11 are secured to the frame parts of the carriage as shown in position to bear against the faces of the upright frame pieces 2 and the faces of these uprights may be recessed or reinforced to accommodate the wear from the rollers.

12 is a cross shaft supported near its ends in the brackets 13 and upon which is carried the tamper carriage, the shaft extending through journal boxes 14 which said journal boxes are fixed within the frame pieces 8. Upon the cross shaft 12 are fixed the series of eccentrics 15 and are embraced by eccentric straps 16, the same being held in position upon the respective eccentrics by means of spacing plates as 17 (best shown in Figs. 8 and 9), having a pair of depending lugs as 18, the said spacing plates being bolted to the free ends of the eccentric straps as at 19. The integral eccentric strap arms 20 are also provided, pivotally connected with T bars 21 as shown in Fig. 5, the lower ends thereof being fixed to T plate 22 as shown in Figs. 1, 2, 4 and 5, to which are fixed the tampers which are made in two leaves a—b and provided with strips c—d, at their lower ends thereof to provide a tamping face of a considerable width. The eccentrics 15 are spaced upon the shaft 12 desired positions apart and are arranged so that when all the eccentrics are disposed upon the shaft that the respective ends of the keys will abut one against the other, and are carried within key ways extending a sufficient portion of the length of the shaft to embrace the series of eccentrics, the said keys engaging key ways in the respective eccentrics. Each of the eccentrics designed to be used in connection with this machine, wherein six separate tampers are employed, are provided with three key ways spaced equal distances apart and are so formed to provide a standard eccentric for all machines in which the same number of tampers is used so that in casting the eccentrics, they are all alike but when it is desired to apply them to a machine, the proper adjustment of the shaft 12 is necessary to facilitate their arrangement in pairs, adapted to deliver an impact simultaneously. This adjustment is accomplished by adjusting the three pairs of eccentrics relatively each in different position so that the respective keys will engage different slots in each separate pair. When so arranged and the machine is operated, three separate pairs will deliver their impact at different and successive intervals. In the construction of machines in which an even number of tampers is used, according to the number of tampers, there shall be provided one half as many key ways. It might be desired to arrange the tampers so as to deliver impact successively by single tampers or an odd number of tampers, or simultaneously by more than two sets, and in such cases the number of key ways to be provided in the eccentrics must correspond with the number of impacts delivered at different times.

To facilitate the proper guiding of the tampers to their work, the vertically supported guide rods 23 are provided, which are fixed upon the arms of T bars 21 and the upper ends thereof are carried in the series of openings in the guide frame pieces as 24, the lower ends in similar guide pieces 25 fixed upon the frame pieces 7 of the carriage.

The tamper carriage is adjustably supported by means of cables 27, one end of each being secured to hooks 28 which are connected with the frame parts as shown in Fig. 4, and bears under pulley wheels 29 on the carriage frame, and thence around the sleeve carried upon drive shaft, said sleeve and drive shaft and their operable connection with the operation for raising and lowering of the carriage to be hereinafter explained.

In the operation of the device, power is applied through a belt wheel 30 which is secured to the collar 31, the same having the centrally disposed grooved part 32 and has integrally connected therewith the flanged friction disks 33. The collar supporting the belt wheel and the friction disks is carried loosely upon shaft 34 which extends the entire length of the machine and is journaled in boxings 35. Upon the shaft 34 are fixed the beveled gears 36.

37 are beveled gears meshing with beveled gears 36 on shaft 34, said gears being provided with sleeve extensions 38 having rectangular openings therein and are carried upon the upper ends of the square shafts 39, said sleeves 38 being round exteriorly and carried within sleeves 40, which form a part of an integral bracket which is connected with the framework of the machine.

41 are collars carried around the lower end of the sleeves 38 and the set screw 42 is adapted to fix the said collars and also the sleeve 38 to the shafts 39. Shafts 39 extend downwardly and are seated within suitable sleeves provided with rectangular openings, said sleeves being exteriorly circular in form and are in turn carried within suitable openings within the brackets as 43, as shown in Figs. 3 and 4.

Upon shafts 39 are carried the beveled gears 44, said gears being provided with the sleeve extensions 45, the said gears and sleeves having rectangular openings to conform with the shafts, the exterior of the sleeves being circular in form and are carried within openings in brackets 13, said gears, and sleeves being secured to shafts 39 by means of set screws as 46 which are supported within collars 47 and penetrate the sleeves 45. The beveled gears 44 are adapted to mesh with beveled gears 48 secured to the respective ends of shaft 12. By means of the connection just above described between the power shaft 34 and the carriage shaft 12, when the shaft 34 is turned, its movement will be transmitted through the gear connection shown to shaft 12 to cause the tampers to be operated.

Upon shaft 34 is fixed a friction wheel 47 by means of the pin 50 being passed through its hub and through the shaft. For moving the flanged friction disk 33 into engagement with the friction wheel 49 to cause the shaft 34 to be turned, the direct mechanism provided comprises a collar 51 best shown in Fig. 13, which embraces the sleeve 31 and is provided with trunnions at its side. The lever 52 is connected with said collar by means of yoke 56 engaging the trunnions thereon, said lever being pivoted as at 53 on the bracket 54 secured to the framework of the machine as shown in Fig. 1, said lever extending downwardly some distance and then at right angles at some distance across the width of the machine so that it bears over the tamper carriage. Obviously, when the end of lever 52 is in the raised position, the flanged friction disk 33 will be thrown out of engagement with the friction wheel 49 and when depressed, the said disk will be caused to engage the friction wheel. For the purpose of accomplishing the holding of the lever in a depressed position normally, the auxiliary lever 55 is provided which is pivoted to the framework of the machine as at 56ª, best shown in Fig. 3 and the free end thereof is adapted to engage with a ratchet plate 57 secured to the framework of the machine. Auxiliary lever 55 is connected with lever 52 by means of the coil spring 58 to facilitate the holding of said lever 52 under elastic tension. Obviously, as the auxiliary lever 55 is depressed, lever 52 will be drawn downwardly through the action of spring 58 and the collar 51 will cause flanged friction disk 33 to engage friction wheel 49. The extent of contact force between the flanged friction disk 33 and friction wheel 49 depends upon the extent of the depression of the auxiliary lever, contra, when the lever 55 is raised to its maximum height, the pressure upon flanged disk 33 will be released. Inasmuch, however, as there is not a positive connection between the auxiliary lever 55 and lever 52, the weight of the extended arm of lever 52 will have a tendency to cause the constant bearing of the flanged friction disk upon the friction wheel. To overcome this tendency, the coil spring 59 is provided which is suitably seated and interposed between the hubs of flanged friction disk 33 and wheel 49 which is adapted to have sufficient expansion strength to separate the parts and to hold them out of engagement until auxiliary lever 55 has been depressed sufficiently to overcome this tension, which it readily does when sufficiently depressed.

In the operation of the machine, it is herein contemplated that the tamper carriage shall be raised and lowered by means connected with the power shaft 34 and necessarily in the operation in certain positions of the tamper carriage, it is necessary that the raising means shall be idle while the shaft 34 is being turned. To facilitate the raising and lowering of the carriage, I have provided the sleeve 60 embracing the shaft 34 and upon which the cables 27 are designed to be wound and unwound in the raising and lowering operation, which is designed to have an intermittent operation in connection with said shaft 34. To accomplish this intermittent operation, I have provided friction disks 61 and 62, disk 61 fixed upon shaft 34 by means of the pin 61ª passing through its hub and the shaft, and disk 62 fixed upon the shaft by means of a suitable spline and groove connection as shown in Fig. 4 so that it may readily slide back and forth thereon, and I have provided upon the shaft the friction disks 63 and 64 each provided with a facing of suitable friction material placed for contact relation with the fixed disks. I have provided loose connection between the disks 63 and 64 with the sleeve 60, which said connection is best illustrated in Figs. 4 and 17. In Fig. 4, it will be observed that the sleeve 60 enters sleeves upon the hubs of the disks 63 and 64, but the particular character of this connection is best shown in Fig. 17, which is a section through lines 17—17 of Fig. 4, looking in the direction of the arrow. 65 is the sleeve on the hub of disk 63, which is provided with a slot as shown in which lug 66 is carried. It will be observed from this view that there is a considerable space between the sleeve and the shaft which is purposely provided as a close contact through such a long bearing would cause considerable friction, and furthermore, as considerable weight is suspended upon the sleeve and shaft, there is a possibility of a slight bending of the same but on account of the provided interposed space, there is, under ordinary conditions, no liability of any binding of the parts, furthermore, the loose connection between the sleeves 60 and the sleeves of disks 63 and 64 and also provided space between the sleeves of the disk and the shaft, will compensate for any slight sagging of the sleeve, by permitting slight adjustment of the disks 63 and 64.

To accomplish the intermittent turning of sleeve 60, it is necessary, of course, to provide for intermittent engagement between the matching friction disks and to accomplish this object, I have provided collars 67 and 68 loose upon shaft 34, each of said collars being provided with rectangularly formed cutaway portions 69, as best shown in Fig. 15, in which figure only one collar 67 is shown as collar 68 is formed identically the same and in the operation of the machine, it is designed that these collars shall be forced apart so that collar 68 shall bear against the fixed collar 70, which forms a stop therefor, and that collar 67 shall bear against the hub of disk 62 to force the same in contact with disk 64, which contact and continued pressure applied to collar 67 will move the sleeve 60, causing contact between the disks 61 and 63.

The particular mechanism provided to accomplish adjustment between the collars 67 and 68 is the lever 71 which is journaled as at 72 upon the bracket 73 secured to the framework of the machine. The rear end of this lever is connected with the frame part of the machine through the coil spring 74 through a hook engagement with the rear end thereof, the rod 75 and the lever 76, one end of which has a pivotal connection with the framework of the machine, and the other end thereof having an adjustable connection with the ratchet rack 77 on the framework of the machine, this connection between the rear end of the lever and the framework of the machine providing both a yielding and adjustable connection whereby the tension on lever 71 may be regulated. The forward end of lever 71 is connected with the lever 78 by means of the rod 79, said rod connection between the two levers being adapted for adjustment by means of the several perforations within the respective levers. The lever 78 may be pivoted to the framework of the machine at one end, if desired, as shown and extends across the front portion thereof. Intermediate of the ends of the lever 71 there is provided an upwardly extending part 80 provided with a U shaped slot therein adapted to embrace the collars 67 and 68 and bearing within the shouldered parts 69. The U shaped central portion of lever 71 is formed substantially in wedge shape, as best shown in Fig. 1.

In the operation of the machine for accomplishing the engagement or release of the friction disks to cause the sleeve 60 to be turned, the lever 78 may be operated up or down to raise or lower lever 71. The lever being down in its lowermost position, the spacing collars 67 and 68 will be relieved from any pressure, but as lever 78 is raised, the wedge formed part of lever 71 will be forced upwardly between the shouldered parts of collars 67 and 68, which will cause them to be forced apart, thereby causing collar 67 to bear against the hub of disk 62, causing it to contact with disk 64, thereby imparting force to sleeve 60 to move it lengthwise which will cause disk 63 thereon to impinge disk 61, thereby causing the sleeve 60 and the disk connections to be rotated with the movement of disks 61 and 62, as the same are turned. With the movement of the sleeve 60, the cables 27 will be caused to be wound upon or unwound from said sleeve, thereby accomplishing the raising or lowering of the carriage.

82 and 82ª are flanged collars fixed upon sleeve 60 and provided to form a backing for the winding of the cable as it is coiled upon the sleeve. Attention is also called to the collar 83, which is provided simply as a support for set screw 84, which said set screw is employed to take up any lost motion on account of the wearing of the friction material on the friction disks, and to accomplish this adjustment, the set screw employed to fix collar 70 on the shaft is loosened and then the set screw is turned either to increase the tension or diminish it, as may be desired by moving the collar 70 toward the friction disk or from it. After such adjustment, the set screw of collar 70 may then be employed to fix the collar upon the shaft. As a supplementary force and in fact, the principal force that causes the proper engagement of the friction disks, I have provided the governors 85 which are pivotally connected to the peripheral edge of disk 64, the ends of the levers, forming the governor, which carry the weights being connected together by coil spring, the other extremities of the levers bearing downwardly between the rear face of disk 62 and the supplemental disk 86 integrally connected with the hub of disk 62.

In the operation of the machine, as the force of the wedge shaped part of lever 71 causes the friction disks to be brought into contact and the sleeve 60 to be rotated, the governor weights are caused to bear outwardly, causing the contact of the rear extensions of the levers thereof with the rear face of disk 62, thereby increasing the contact force between the friction disks, which force will continue until the wedge is withdrawn from between the spacing collars 67 and 68, at which time the pressure from the governor will cease and the sleeve 60 will come to rest.

In the operation of the machine, the shaft 34 is designed to be turned continuously in one direction and the mechanism for accomplishing the intermittent coöperation of sleeve 60 will cause the tamper carriage by the winding of the cables 27 upon said sleeve, to be raised. The carriage is lowered, or descends, through the action of gravity whenever the engagement between the shaft 34 and sleeve 60 ceases, which is accomplished as heretofore explained, by the separation of disks 61 and 63, and disks 62 and 64, sleeve 60 when so disengaged from shaft 34 turning in the reverse direction, thereby allowing the cables to unwind and the carriage to descend. Inasmuch as it is necessary that the cables shall be of sufficient length and probably a little more to allow the carriage to drop to position to tamp materials in the lowest part of the mold, it follows that as the mold is filled up, the carriage will be raised, and that the cables will be slackened until there would be a considerable length thereof necessary to be taken up when the sleeve 60 is operated to wind up the cables and raise the tamper carriage. I have found in practice that as the sleeve is started by the friction appliances to move with the shaft 34, it moves so rapidly that in case there is any slack it causes a severe jerk upon the cables or chains, whichever are used, sufficient to break them occasionally. To overcome this difficulty, I provide the coil spring connecting the forward arms of the governor, providing sufficient tension to force them in position to cause contact with supplemental disk 86, the resistance of such contact causing slight forward tension to be exerted through the disk 64, sleeve 60 and disk 63 upon disk 61, this tension being regulated to be just sufficient to cause the sleeve to be turned to take up any slack that there may be in the cable after the carriage has been so lowered, or any slack that may be occasioned by the raising of the carriage as the mold is being gradually filled, but not sufficient tension to exert any considerable raising force upon the tamper carriage itself. The tamper carriage having considerable weight, I have found it causes a considerable strain upon the sleeve 60 and shaft 34 and have therefore provided intermediate supports comprising anti-friction rollers 90, a pair of such rollers being provided at each support, the said rollers being suitably journaled within bearings provided and connected with the upper frame part of the machine substantially as shown in Figs. 1, 2 and 4 of the drawings.

In the arrangement of the machine, it is designed that the flanged friction disk 33 shall be operated automatically to engage and release clutch wheel 49, through the movement of the tamper carriage. To accomplish this result, the lever 52 connected with the flanged disk 33 is extended a short distance across the width of the machine and within the path of the movable tamper carriage. As the carriage is raised and strikes the lever R, the flanged friction disk 33 is thrown from engagement with clutch wheel 49, thereby releasing shaft 34, which will come to rest, while the disk 33 and the connected parts will turn idly upon the shaft 34. As the carriage is caused to descend by the releasing of sleeve 60 from its connected relation with shaft 34, as soon as it is out of contact with lever 52, the said lever, through the action of spring 58 will cause flanged disk 33 to engage friction wheel 49, thereby causing the shaft 34 to be turned and the tampers to be operated.

In the operation of the machine, when the connection is made between shaft 34 and sleeve 60 to cause the tamper carriage to be raised, it is necessarily raised rapidly and as the carriage has considerable weight and the resistance of lever 52 very slight, the momentum is disposed to carry it still upwardly after the power connection is released, therefore, I have provided the cushion springs 91 bearing underneath the frame pieces 3 and around pin 92 carried through and vertically movable within a perforation in the framework and properly secured, whereby when the carriage is raised, the frame part thereof will contact with the head of pin 92, which moving upward readily, will cause spring 91 to be compressed, thereby providing a yielding stop or cushion to overcome the momentum of the carriage in its upward movement, and thereby preventing excessive jarring of the machine.

To overcome any tendency of the carriage to be forced downwardly through the action of cushion spring 91, I have provided the ratchet wheel 93 fixed upon the end of shaft 34 and adapted to operate in connection therewith, and have provided the dog 94 suitably secured to the framework of the machine, and held under tension in contact with said ratchet wheel, as best shown in Fig. 10, which said ratchet wheel and pawl operate to prevent any backward movement of shaft 34. The cushion spring also serves to give the carriage a slight impetus to start the carriage downwardly when the shaft 34 and sleeve 60 are disengaged, from each other, the expansion of the spring being sufficient to overcome any ordinary binding tendency between the carriage frame and the main frame within which it bears.

What I claim is:

1. In a device of the class described, the combination of a frame structure, a vertically movable frame therein provided with tamping members, means for operating the tamping members, means for raising the movable frame, and means actuated by the descent of the movable frame to retard its downward movement.

2. In a device of the class described, the combination of a frame structure, a vertically movable frame supported therein provided with tamping members, means for operating the tamping members, means for raising the movable frame comprising a rotatable shaft in the main frame, a sleeve thereon, a flexible connection between said sleeve and the movable frame, and means actuated by the descent of the movable frame to retard its movement.

3. In a device of the class described, the combination of a frame structure, a vertically movable frame supported therein provided with tamping members, means for raising the movable frame comprising a rotatable shaft in the main frame, an intermittently revoluble sleeve thereon connected with the movable frame and means automatically actuated by the descent of the movable frame to retard its downward movement comprising parts upon said shaft and sleeve relatively engageable through the turning of said sleeve upon the shaft caused by the descent of the movable frame.

4. In a device of the class described, the combination of a stationary frame structure, a vertically movable frame supported therein, means for raising the movable frame and means for controlling its downward movement comprising parts relatively engageable actuated by the descent of the movable frame to frictionally retard the downward movement of said frame.

5. In a device of the class described, the combination of a main frame structure, a vertically movable frame supported therein provided with tamping members, means for operating the tamping members, a rotatable shaft in the main frame, means for raising the movable frame comprising a sleeve on said shaft, a flexible connection from said sleeve to the movable frame, clutch parts upon the sleeve and the shaft relatively adjustable to cause intermittent engagement therebetween, and means for retarding the descent of the movable frame and for taking up slack in the flexible connection comprising parts respectively upon the shaft and the sleeve, normally in slight frictional engagement, the part upon the sleeve operable through the turning thereof in the descent of the movable frame to engage the part upon the shaft with increased frictional force.

6. In a device of the class described, a main supporting frame, a vertically movable frame supported therein, a series of reciprocally operable tampers, a cross shaft in said movable frame, a series of eccentrics carried upon said shaft, each provided with a series of grooves spaced at intervals apart adapted to match with a groove or grooves in the cross shaft, whereby said eccentrics may be adjusted in different positions thereon, a series of tampers connected with said eccentrics, guides connected with the frame and guide rods with the tamper supports, an intermittently frictionally operable drive shaft supported upon the main frame, means connecting the power shaft with the shaft in the movable frame to cause the tampers to be operated, a sleeve carried upon and intermittently frictionally operable by the drive shaft and flexible means connecting said sleeve with the carriage to facilitate the raising of the same, means held under spring tension connected with the power shaft to cause an engagement with means upon the drive shaft to turn the same, and also automatically operable through the movement of the movable carriage to cause a release of the frictional parts between the power shaft and the drive shaft.

7. In a device of the class described, a main supporting frame, a vertically movable carriage supported therein, a cross shaft in the movable frame and a series of tampers eccentrically supported upon said shaft, a drive shaft supported upon the main frame, means connecting the drive shaft with the shaft in the movable carriage and means flexibly connecting the drive shaft with the movable carriage to facilitate the raising of the carriage through the operation of the shaft and the lowering of the same without interfering with the movement of the drive shaft, comprising a sleeve carried upon the drive shaft and connected with the carriage by means of chains or cables, friction disks having a yielding connection with the sleeve, a fixed disk on the drive shaft engageable with one of the disks connected with the sleeve, horizontally movable connected disks having a spline and groove connection with the drive shaft and engageable with one of the disks connected with the sleeve, means operable to cause alternate engagement and release between the disks of the drive shaft and of the sleeve whereby as the drive shaft is rotated, the sleeve may be moved lengthwise upon the shaft to cause complete engagement of the disks.

8. In a device of the class described, a main supporting frame, a vertically movable carriage supported therein, a cross shaft in the movable frame and a series of tampers eccentrically supported upon said shaft, a drive shaft supported upon the main frame, means connecting the drive shaft with the shaft in the movable carriage and means flexibly connecting the drive shaft with the movable carriage to facilitate the raising of the carriage through the operation of the shaft and the lowering of the same without interfering with the movement of the drive shaft, comprising a sleeve carried upon the drive shaft and connected with the carriage by means of chains or cables, friction disks having a yielding connection with the sleeve, a fixed disk on the drive shaft engageable with one of the disks connected with the sleeve, horizontally movable connected disks having a spline and groove connection with the drive shaft and engageable with one of the disks connected with the sleeve, a suitable governor connected with one of the disks on the sleeve and operable under rotation of the sleeve to engage the horizontally movable connected disks on the drive shaft, means operable to cause alternate engagement and release between the disks of the drive shaft and the disks of the sleeve.

9. In a device of the class described, a main supporting frame, a vertically movable carriage supported therein, a cross shaft in the movable frame and a series of tampers eccentrically supported upon said shaft, a drive shaft supported upon the main frame, means connecting the drive shaft with the shaft in the movable carriage and means flexibly connecting the drive shaft with the movable carriage to facilitate the raising of the carriage through the operation of the shaft and the lowering of the same without interfering with the movement of the drive shaft, comprising a sleeve carried upon the drive shaft and connected with the carriage by means of chains or cables, friction disks having a yielding connection with the sleeves, a fixed disk on the drive shaft engageable with one of the disks connected with the sleeve, horizontally movable connected disks having a spline and groove connection with the drive shaft and engageable with one of the disks connected with the sleeve, grooved spacing collars loosely carried upon the drive shaft adjustably spaced apart and means for causing such adjustment, a lever held under spring tension and operable through a wedge formed portion thereof to engage the grooved spacing collars to force them apart to cause horizontal movement of abutting friction disks and connecting sleeve whereby frictional engagement is established between the sleeve and the drive shaft, and said lever is likewise operable to cause the release of said grooved spacing collars to cause a disengagement between the matching friction disks.

10. In a device of the class described, a main supporting frame, a vertically movable carriage supported therein, a cross shaft supported in said movable frame provided with a series of tampers eccentrically supported thereon, a drive shaft supported upon the main frame within suitable boxings and supported intermediate of its ends upon suitable rollers arranged in pairs, a collar upon said shaft provided with belt wheel and having a flanged friction disk adapted to engage friction wheel upon the shaft, a coiled compression spring suitably supported and interposed between the friction wheel and flanged friction disk adapted to normally hold the disk and wheel from engagement, a lever suitably connected with the sleeve on the shaft, the end thereof bearing across the path of the movement of the movable carriage, spring tension mechanism adjustably connected with said bar to regulate the tension of engagement between the friction wheel of the shaft and the flanged disk on the sleeve.

11. In a device of the class described, a main supporting frame, a vertically movable carriage supported in the main frame, intermittently actuated tampers eccentrically supported on a transverse shaft in the movable frame, means for frictionally driving the tamper shaft and for raising the carriage, and automatically actuated means controlled by the movable frame to frictionally retard the gravity descent of the movable frame.

12. In a device of the class described, the combination with a main frame and a vertically movable frame supported therein, of a frictionally driven shaft supported on the main frame, a sleeve supported thereon and frictionally connected and driven thereby, flexible means connecting the sleeve on the shaft and the movable carriage to raise the same with the turning of the shaft and automatically actuated means controlled by the descent of the movable frame to retard the gravity descent of the same.

13. In a device of the class described, the combination with a main frame and a vertically movable frame supported therein, of a frictionally driven shaft supported on the main frame, a sleeve supported thereon and frictionally connected and driven thereby, flexible means connecting the sleeve on the shaft and the movable frame to raise the same with the turning of the shaft, and means between the shaft and sleeve actuated through the movement of the movable frame to frictionally retard the gravity descent of the movable frame.

14. In a device of the class described, the combination with a main frame and a vertically movable frame supported therein, of a series of tampers eccentrically supported upon a shaft in the movable frame, a frictionally driven shaft upon the main frame, provided with a sleeve thereon frictionally operable thereby, means connecting the shaft on the main frame with the shaft in the movable frame to cause the tampers to be operated, and flexible means connecting the sleeve with the movable frame to facilitate the raising of the same, and means connectible between the sleeve and the shaft supporting it actuated through the descent of the movable frame to frictionally retard the gravity descent of the same.

15. In a device of the class described, the combination with a main frame and a vertically movable frame supported therein, of a series of tampers eccentrically supported upon a shaft in the movable frame, a frictionally driven shaft upon the main frame, provided with a sleeve thereon frictionally operable thereby, means connecting the shaft on the main frame with the shaft in the movable frame to cause the tampers to be operated, and flexible means connecting the sleeve with the movable frame to facilitate the raising of the same, and means connectible between the sleeve and the shaft supporting it to frictionally retard the gravity descent of the movable frame, and a suitable ratchet and pawl connection between the main frame and the shaft supported thereon to prevent the backward turning of said shaft under the weight of the movable frame when the frictional driving power is disconnected.

16. In a device of the class described, the combination with a main frame and a vertically movable frame supported therein, of a series of tampers eccentrically supported upon a shaft in the movable frame, a frictionally driven shaft upon the main frame, provided with a sleeve thereon frictionally operable thereby, means connecting the shaft on the main frame with the shaft in the movable frame to cause the tampers to be operated, and flexible means connecting the sleeve with the movable frame to facilitate the raising of the same, and means connectible between the sleeve and the shaft supporting it to frictionally retard the gravity descent of the movable frame, and a suitable ratchet and pawl connection between the main frame and the shaft supported thereon to prevent the backward turning of said shaft under the weight of the movable frame when the frictional driving power is disconnected, and a cushion spring on the frame in the path of the movable carriage serving as a stop against upward movement of the movable frame and as a starter for its downward movement.

17. In a device of the class described, a main frame, a vertically movable frame supported therein, a cross shaft in said movable frame, a series of tampers supported in the movable frame, an intermittently frictionally revoluble drive shaft on the main frame, a sleeve on the drive shaft friction disks on the shaft one fixed and the other adjustable and friction disks connected with the sleeve adapted for contact relation, means for causing intermittent engagement between the disks on the shaft and the sleeve to cause the sleeve to be turned with the shaft or allow it to be at rest and means operable through the turning of the sleeve to retard the gravity descent of the movable frame.

18. In a device of the class described, a main frame, a vertically movable frame supported therein, a cross shaft in said movable frame, a series of tampers supported in the movable frame, a revoluble drive shaft on the main frame, a sleeve on the drive shaft, friction disks on the shaft one fixed and the other adjustable and friction disks connected with the sleeve adapted for contact relation, means for causing intermittent engagement between the disks on the shaft and the sleeve to cause the sleeve to be turned with the shaft or allow it to be at rest, flexible means connecting the sleeve with the movable frame to facilitate the raising of the same and means operable through the turning of the sleeve to retard the gravity descent of the movable frame.

19. In a device of the class described, a main frame, a vertically movable frame supported therein, a cross shaft in said movable frame, a series of tampers supported in the movable frame, a revoluble shaft on the main frame, means connecting the drive shaft with the cross shaft of the movable frame to cause the tampers to be operated, a sleeve on the drive shaft, friction disks on the shaft one fixed and the other adjustable and friction disks connected with the sleeve adapted for contact relation, means for causing intermittent engagement between the disks on the shaft and the sleeve to cause the sleeve to be turned with the shaft or allow it to be at rest and means operable through the turning of the sleeve to retard the gravity descent of the movable frame.

20. In a device of the class described, a main frame, a vertically movable frame supported therein, a cross shaft in said movable frame, a series of tampers supported in the movable frame, a revoluble drive shaft, means connecting the drive shaft with the cross shaft of the movable frame to cause the tampers to be operated, a sleeve on the drive shaft, friction disks on the shaft one fixed and the other adjustable and friction disks connected with the sleeve adapted for contact relation, means for causing intermittent engagement between the disks on the shaft and the sleeve to cause the sleeve to be turned with the shaft or allow it to be at rest, and flexible means connecting the sleeve with the movable frame to facilitate the raising of the same and means connected with the driven shaft and operable through the movement of the movable frame to stop the movement of said shaft or to cause it to be revolved.

21. In a device of the class described, the combination with a main supporting frame provided with a driven shaft, and a vertically movable frame supported therein, provided with guide rods for the tamping bars, and friction reducing rollers thereon, a revoluble shaft in the movable frame, an eccentrically supported series of tampers carried thereon, an intermittently frictionally driven part upon the shaft of the main frame, flexible means connecting the movable frame with the intermittently driven part on the drive shaft adapted to be coiled and uncoiled in the main frame to facilitate the raising and lowering of the movable frame, means upon said intermittently driven part for causing the intermittent frictional connection between the sleeve and the drive shaft and means connecting said shaft of the main frame with the shaft of the movable frame to cause the tampers to be operated.

22. In a device of the class described, the combination with a main supporting frame provided with a driven shaft, and a vertically movable frame supported therein, provided with guide rods for the tamping bars and friction reducing rollers thereon, a revoluble shaft in the movable frame, an eccentrically supported series of tampers carried thereon, an intermittently frictionally driven part upon the shaft of the main frame, flexible means connecting the movable frame with the intermittently driven part on the drive shaft adapted to be coiled or uncoiled on the intermittently driven part on the drive shaft to facilitate the raising and lowering of the movable frame, means upon said intermittently driven part for causing the intermittent frictional connection between the sleeve and the drive shaft, and means upon the intermittently driven part operable through the turning thereof through the force of the descent of the movable frame, to frictionally engage a part upon the drive shaft to retard the downward movement of the movable frame.

23. In a device of the class described, the combination with a main supporting frame provided with a driven shaft, and a vertically movable frame supported therein provided with guide rods for the tamping bars and friction reducing rollers thereon, a revoluble shaft in the movable frame, an eccentrically supported series of tampers carried thereon, an intermittently frictionally driven part upon the shaft of the main frame, flexible means connecting the movable frame with the intermittently driven part on the drive shaft adapted to be coiled or uncoiled on said intermittently driven part to facilitate the raising and lowering of the movable frame, means upon said intermittently driven part for causing the intermittent frictional connection between the sleeve and the drive shaft, means upon the intermittently driven part operable through the turning thereof through the force of the descent of the movable frame, to frictionally engage a part upon the drive shaft to retard the downward movement of the movable frame, and means connecting said shaft of the main frame with the shaft of the movable frame to cause the tampers to be operated.

24. In a device of the class described, the combination of a stationary frame provided with a frictionally driven shaft therein, a frame supported in the stationary frame provided with a cross shaft and vertically movable therein, a plurality of reciprocating tamping members carried by said frame, guides in said frame for the tamping members, a plurality of eccentrics upon the cross shaft, each pivotally connected with the tamping members, means for raising and lowering said movable frame comprising a sleeve on the drive shaft, flexible means connecting the sleeve with the movable frame, a drive shaft, means under the control of the operator for causing intermittent engagement and release between said sleeve and the drive shaft, whereby when the parts are engaged the movable frame will be raised and when released the movable frame will descend by its own weight, means on the sleeve operable by its movement in the descent of the movable frame to frictionally retard the downward movement of the movable frame.

25. In a device of the class described, the combination of a stationary frame provided with a driven shaft therein, a frame supported in the stationary frame provided with a cross shaft and vertically movable therein, a plurality of reciprocating tamping members carried by said frame, means for operating the tamping members from the cross shaft, means for raising and lowering said movable frame comprising a sleeve on the drive shaft, means connecting the sleeve with the movable frame, means under the control of the operator for causing intermittent engagement and release between said sleeve and the drive shaft, and means operable by the movement of the sleeve through the force of the descent of the movable frame to frictionally retard the downward movement of the movable frame.

26. In a device of the class described, the combination of a stationary frame provided with a frictionally driven shaft therein, a frame supported in the stationary frame provided with a cross shaft and vertically movable therein, a plurality of reciprocating tamping members carried by said frame, guides in said frame for the tamping members, a plurality of eccentrics upon the cross shaft, each pivotally connected with the tamping members, means for raising and lowering said movable frame comprising a sleeve on the drive shaft, flexible means connecting the sleeve with the movable frame, means under the control of the operator for causing intermittent engagement and release between said sleeve and the drive shaft, comprising disks on said sleeve and shaft movable relatively to cause alternate impingement and release, whereby when the parts are engaged the movable frame will be raised, and when released, the movable frame will descend by its own weight, and means operable by the movement of the sleeve through the force of the descent of the movable frame to frictionally retard the downward movement of the movable frame.

27. In a device of the class described, the combination of a stationary frame provided with a frictionally driven shaft therein, a frame supported in the stationary frame provided with a cross shaft and vertically movable therein, a plurality of reciprocating tamping members carried by said frame, guides in said frame for the tamping members, means for operating the tamping members from the cross shaft, means for raising and lowering said movable frame comprising a sleeve on the drive shaft, flexible means connecting the sleeve with the movable frame, means under the control of the operator for causing intermittent engagement and release between said sleeve and the drive shaft, comprising disks on said sleeve and shaft movable relatively to cause alternate impingement and release, whereby when the parts are engaged the movable frame will be raised, and when released, the movable frame will descend by its own weight, and means operable by the movement of the sleeve through the force of the descent of the movable frame to frictionally retard the downward movement of the movable frame.

28. In a device of the class described, the combination with a stationary frame provided with a drive shaft therein, of a movable frame carrying tamping bars, means for operating the tamping members from the drive shaft, means for raising the movable frame comprising a sleeve upon the drive shaft, flexible means connecting the movable frame with said sleeve, interengageable disks respectively upon the sleeve and the drive shaft movable relatively to cause said sleeve to be intermittently engaged upon said shaft to cause it to turn therewith, means for retarding the downward movement of the movable frame, comprising a governor connected with the sleeve, and a fixed part upon the drive shaft adapted to be engaged thereby when the governor is actuated through the movement of the sleeve in the descent of the movable frame.

29. In a device of the class described, the combination with a stationary frame provided with a drive shaft therein, of a movable frame carrying tamping bars, means for operating the tamping members from the drive shaft, means for raising the movable frame comprising a sleeve upon the drive shaft, flexible means connecting the movable frame with said sleeve, interengageable disks respectively upon the sleeve and the drive shaft movable relatively to cause said sleeve to be intermittently engaged upon said shaft to cause it to turn therewith and means for retarding the downward movement of the movable frame comprising a governor connected with the sleeve and a fixed part upon the drive shaft adapted to be engaged thereby when the governor is actuated through the movement of the sleeve in the descent of the movable frame, a constantly driven member, clutch parts upon the drive shaft, and the constantly driven member adjustable relatively and means actuated by the movable frame to cause said clutch parts to be engaged and disengaged.

30. In a device of the class described, the combination with a stationary frame provided with a drive shaft therein, of a movable frame carrying tamping members, means for operating the tamping members from the drive shaft, means for raising the movable frame comprising a sleeve upon the drive shaft, flexible means connecting the movable frame with said sleeve, interengageable disks respectively upon the sleeve and the drive shaft movable relatively to cause said sleeve to be intermittently engaged upon said shaft to cause it to turn therewith, means for retarding the downward movement of the movable frame comprising a governor connected with the sleeve and a fixed part upon the drive shaft adapted to be engaged thereby when the governor is actuated through the movement of the sleeve in the descent of the movable frame, a constantly driven member, clutch parts upon the drive shaft and the constantly driven member, adjustable relatively, means actuated by the movable frame to cause said clutch parts to be engaged and disengaged, and supporting rollers upon the main frame for the drive shaft and sleeve intermediate the supports for the drive shaft.

31. In a device of the class described, the combination with a stationary frame provided with a drive shaft therein, of a movable frame carrying tamping members, means for operating the tamping members from the drive shaft, means for raising the movable frame comprising a sleeve upon the drive shaft, flexible means connecting the movable frame with said sleeve, interengageable disks respectively upon the sleeve and the drive shaft movable relatively to cause said sleeve to be intermittently engaged upon said shaft to cause it to turn therewith, means for retarding the downward movement of the movable frame comprising a governor connected with the sleeve and a fixed part upon the drive shaft adapted to be engaged thereby when the governor is actuated through the movement of the sleeve in the descent of the movable frame, a constantly driven member, clutch parts upon the drive shaft and the constantly driven member, adjustable relatively, means actuated by the movable frame to cause said clutch parts to be engaged and disengaged, and a cushion spring upon the main frame adapted to receive the upward thrust of the movable frame to stop its upward movement and expansible to give the movable frame a descending impetus when the sleeve is released from its engagement with the drive shaft.

32. In a device of the class described, the combination with a stationary frame provided with a drive shaft therein, of a movable frame carrying tamping members, means for operating the tamping members from the drive shaft, means for raising the movable frame comprising a sleeve upon the drive shaft, flexible means connecting the movable frame with said sleeve, interengageable disks respectively upon the sleeve and the drive shaft movable relatively to cause said sleeve to be intermittently engaged upon said shaft to cause it to turn therewith, means for retarding the downward movement of the movable frame comprising a governor connected with the sleeve and a fixed part upon the drive shaft adapted to be engaged thereby when the governor is actuated through the movement of the sleeve in the descent of the movable frame, a constantly driven member, clutch parts upon the drive shaft and the constantly driven member, adjustable relatively, means actuated by the movable frame to cause said clutch parts to be engaged and disengaged, supporting rollers upon the main frame for the drive shaft and sleeve intermediate the supports for the drive shaft, and a cushion spring upon the main frame adapted to receive the upward thrust of the movable frame to stop its upward movement and expansible to give the movable frame a descending impetus when the sleeve is released from its engagement with the drive shaft.

33. In a machine of the class described, the combination of a main supporting frame provided with a drive shaft therein, a movable frame supported therein provided with a cross shaft, a plurality of eccentrics upon said shaft placed thereon at different angles relatively, eccentric yokes embracing the said eccentrics, a plurality of tamping bars pivotally connected with said yokes, guides for the tamping bars within said movable frame, means for operating the cross shaft of the movable frame from the drive shaft of the stationary frame, means for raising and lowering the movable frame comprising an intermittently driven sleeve upon the drive shaft, flexible means connecting the sleeve with the movable frame, disks upon said sleeve and drive shaft relatively adjustable to cause the sleeve to be intermittently revolved with said drive shaft, means under the control of the operator for causing such intermittent engagement between said sleeve and drive shaft and means operable by the movement of the sleeve through the force of the descent of the movable frame to frictionally retard the downward movement of the movable frame.

34. In a machine of the class described, the combination of a main supporting frame provided with a drive shaft therein, a movable frame supported therein provided with a cross shaft, a plurality of eccentrics upon said shaft placed thereon at different angles relatively, eccentric yokes embracing said eccentrics, a plurality of tamping bars pivotally connected with said yokes, guides for the tamping bars within said movable frame, means for operating the cross shaft of the movable frame from the drive shaft of the stationary frame, means for raising and lowering the movable frame comprising an intermittently driven sleeve upon the drive shaft, flexible means connecting the sleeve with the movable frame, disks upon said sleeve and drive shaft relatively adjustable to cause the sleeve to be intermittently revolved with said drive shaft, means under the control of the operator for causing such intermittent engagement between said sleeve and drive shaft, and means for retarding the downward movement of the movable frame, comprising a part upon the sleeve and operable through the movement thereof when released from its engagement with the drive shaft to frictionally engage a part upon the drive shaft.

35. In a machine of the class described, the combination of a main supporting frame provided with a drive shaft therein, a movable frame supported therein provided with a cross shaft, a plurality of tamping members, means for operating the tamping members from the cross shaft, means for operating the cross shaft of the movable frame from the drive shaft of the stationary frame, means for raising and lowering the movable frame, a sleeve upon the drive shaft, means under the control of the operator for causing intermittent engagement between said sleeve and the drive shaft, and means operable through the movement of said sleeve caused by the gravity descent of the movable frame to frictionally retard the downward movement of the latter.

36. In a machine of the class described, the combination of a main supporting frame provided with a drive shaft therein, a movable frame supported therein provided with a cross shaft, a plurality of eccentrics upon said shaft placed thereon at different angles relatively, eccentric yokes embracing said eccentrics, a plurality of tamping bars pivotally connected with said yokes, guides for the tamping bars within said movable frame, means for operating the cross shaft of the movable frame from the drive shaft of the stationary frame, means for raising and lowering the movable frame, comprising a sleeve turned in one direction by engagement with the drive shaft, and in the opposite direction by the weight of the movable frame, disks upon the drive shaft, one fixed and the other longitudinally adjustable thereon, disks upon the ends of the sleeve, means under the control of the operator for moving the adjustable disk into and out of engagement with a disk upon the sleeve to cause said sleeve to be alternately engaged with said shaft and then released therefrom, and means for retarding the downward movement of the movable frame, comprising a part upon the sleeve actuated by the turning of the sleeve by the weight of the movable frame to impinge a disk on the drive shaft.

37. In a machine of the class described, the combination of a main supporting frame provided with a drive shaft therein, a movable frame supported therein provided with a cross shaft, a plurality of eccentrics upon said shaft placed thereon at different angles relatively, eccentric yokes embracing said eccentrics, a plurality of tamping bars pivotally connected with said yokes, guides for the tamping bars within said movable frame, means for operating the cross shaft of the movable frame from the drive shaft of the stationary frame, means for raising and lowering the movable frame comprising a sleeve turned in one direction by engagement with the drive shaft, and in the opposite direction by the weight of the movable frame, disks upon the drive shaft, one fixed and the other longitudinally adjustable thereon, disks upon the ends of the sleeve, means under the control of the operator for moving the adjustable disk into and out of engagement with the disk upon the sleeve to cause said sleeve to be alternately engaged with said shaft and then released therefrom, and means for retarding the downward movement of the movable frame comprising a governor connected with the sleeve actuated by the turning of the sleeve by the weight of the movable frame to impinge a disk on the drive shaft.

38. In a machine of the class described, the combination of a main supporting frame provided with a drive shaft therein, a movable frame supported therein provided with a cross shaft, a plurality of eccentrics upon said shaft placed thereon at different angles relatively, eccentric yokes embracing said eccentrics, a plurality of tamping bars pivotally connected with said yokes, guides for the tamping bars within said movable frame, means for operating the cross shaft of the movable frame from the drive shaft of the stationary frame, means for raising and lowering the movable frame comprising a sleeve turned in one direction by engagement with the drive shaft, and in the opposite direction by the weight of the movable frame, disks upon the drive shaft, one fixed and the other longitudinally adjustable thereon, disks upon the ends of the sleeve, means under the control of the operator for moving the adjustable disk into and out of engagement with the disk upon the sleeve to cause said sleeve to be alternately engaged with said shaft and then released therefrom, and means for retarding the downward movement of the movable frame, comprising a governor connected with the sleeve actuated by the turning of the sleeve by the weight of the movable frame to impinge a disk on the drive shaft, a constantly driven member, interengageable clutch parts interposed between the constantly driven member and the drive shaft, and means actuated by the movable frame to cause said clutch parts to be alternately engaged and disengaged.

39. In a machine of the class described, the combination of a main supporting frame provided with a drive shaft therein, a movable frame supported therein provided with a cross shaft, a plurality of eccentrics upon said shaft placed thereon at different angles relatively, eccentric yokes embracing said eccentrics, a plurality of tamping bars pivotally connected with said yokes, guides for the tamping bars within said movable frame, means for operating the cross shaft of the movable frame from the drive shaft of the stationary frame, means for raising and lowering the movable frame comprising a sleeve turned in one direction by engagement with the drive shaft, and in the opposite direction by the weight of the movable frame, disks upon the drive shaft, one fixed and the other longitudinally adjustable thereon, disks on the ends of the sleeve, means under the control of the operator for moving the adjustable disk into and out of engagement with the disk upon the sleeve to cause said sleeve to be alternately engaged with said shaft and then released therefrom, and means for retarding the downward movement of the movable frame, comprising a governor connected with the sleeve actuated by the turning of the sleeve by the weight of the movable frame to impinge a disk on the drive shaft, a constantly driven member, interengageable clutch parts interposed between the constantly driven member and the drive shaft, and means actuated by the movable frame to cause said clutch parts to be alternately engaged and disengaged, and means for supporting the sleeve and drive shaft at points intermediate the end supports for the drive shaft.

40. In a device of the class described, the combination of a main supporting frame provided with a drive shaft supported therein, a vertically movable frame supported therein, a cross shaft in the movable frame, a plurality of tamping bars, means for operating said tamping bars from the cross shaft, means for turning the cross shaft to operate the tamping bars from the drive shaft, comprising a pair of vertically disposed shafts driven by suitable gears from the drive shaft, brackets on the ends of the cross shaft, sleeves slidably related to said vertically disposed shafts and carried upon said brackets, and suitable gearing connections between said cross shaft and said sleeves, means for raising and lowering the movable frame, comprising a sleeve upon the drive shaft, a flexible connection between the movable frame and said sleeve, parts upon said sleeve and drive shaft adjustable relatively to cause alternate engagement and release between said sleeve and the drive shaft, whereby when the sleeve and shaft are in engagement while the drive shaft is in operation the movable frame will be raised and when disengaged, the sleeve will turn through the weight of the movable frame in its descent and means operable through the movement of the sleeve in the descent of the movable frame and while the drive shaft is stationary, to frictionally retard the downward movement of the movable frame.

41. In a device of the class described, the combination of a main supporting frame provided with a drive shaft supported therein, a vertically movable frame supported therein, a cross shaft in the movable frame, a plurality of tamping bars in the movable frame, means for operating said tamping bars from the cross shaft, means for turning the cross shaft to operate the tamping bars from the drive shaft, comprising a pair of vertically disposed shafts, driven by suitable gears from the drive shaft, brackets on the ends of the cross shaft, sleeves slidably related to said vertically disposed shafts and carried upon said brackets, suitable gearing connections between said cross shaft and said sleeves, means for raising and lowering the movable frame, comprising a sleeve upon the drive shaft, a flexible connection between the movable frame and said sleeve, parts upon said sleeve and drive shaft adjustable relatively to cause alternate engagement and release between said sleeve and the drive shaft, whereby when the sleeve and shaft are in engagement the movable frame will be raised and when disengaged, the sleeve will turn through the weight of the movable frame in its descent, and means operable through the movement of the sleeve in the descent of the movable frame to frictionally retard the downward movement of the latter.

42. In a device of the class described, the combination of a main supporting frame provided with a drive shaft supported therein, a vertically movable frame supported therein, a cross shaft in the movable frame, a plurality of eccentrics thereon set at different angles relatively, yokes embracing each eccentric, tamping bars connected with said yokes, guides in the movable frame for the tamping bars, means for turning the cross shaft to operate the tamping bars from the drive shaft, comprising a pair of vertically disposed shafts driven by suitable gears from the drive shaft, brackets on the ends of the cross shaft, sleeves slidably related to said vertically disposed shafts and carried upon said brackets, suitable gearing connections between said cross shaft and said sleeves, means for raising and lowering the movable frame comprising a sleeve upon the drive shaft provided with disks thereon, disks upon the drive shaft, one fixed and the other adjustable longitudinally of the drive shaft, spacing collars upon the drive shaft, one fixed and the other adjustable, and a wedge adapted to be inserted between and withdrawn from the spacing collars to cause the disks on the sleeve and the shaft to be alternately interengaged and released, whereby when they are interengaged the sleeve will be turned with the shaft and when disengaged, the sleeve will be turned independently of the shaft, through the weight of the movable frame.

43. In a device of the class described, the combination of a main supporting frame provided with a drive shaft supported therein, a vertically movable frame supported therein, a cross shaft in the movable frame, a plurality of eccentrics thereon set at different angles relatively, yokes embracing each eccentric, tamping bars connected with said yokes, guides in the movable frame for the tamping bars, means for turning the cross shaft to operate the tamping bars from the drive shaft, comprising a pair of vertically disposed shafts driven by suitable gears from the drive shaft, brackets on the ends of the cross shaft, sleeves slidably related to said vertically disposed shafts and carried upon said brackets, suitable gearing connections between said cross shaft and said sleeves, means for raising and lowering the movable frame comprising a sleeve upon the drive shaft provided with disks thereon, disks upon the drive shaft, one fixed and the other adjustable longitudinally of the drive shaft, spacing collars upon the drive shaft, one fixed and the other adjustable, and a wedge adapted to be inserted between and withdrawn from the spacing collars to cause the disks on the sleeve and the shaft to be alternately interengaged and released, whereby when they are interengaged the sleeve will be turned with the shaft and when disengaged, the sleeve will be turned independently of the shaft, through the weight of the movable frame, a constantly driven member, interengageable clutch parts interposed between the constantly driven member and the drive shaft, means operable through the movement of the movable frame to cause said interengageable clutch members to be alternately engaged and released, whereby when engaged the shaft will be turned and when disengaged the shaft will be released and will remain at rest.

44. In a device of the class described, the combination of a main supporting frame provided with a drive shaft therein, a vertically movable frame carrying tampers, means for operating said tampers from the drive shaft, means for raising the movable frame comprising a sleeve normally loose upon the drive shaft, comprising disks upon the sleeve and shaft relatively adjustable to cause engagement and release between said sleeve and drive shaft, means operable through the movement of the sleeve when said shaft and sleeve are driven together, to induce frictional contact between the disks on the sleeve and those on the shaft, means operable through the movement of the sleeve when it is freed from the shaft to induce frictional engagement between the disks on the shaft and the sleeve to retard the downward movement of the movable frame.

45. In a device of the class described, the combination of a main supporting frame provided with a drive shaft therein, a vertically movable frame carrying tampers, means for operating said tampers from the drive shaft, means for raising the movable frame comprising a sleeve normally loose upon the drive shaft, comprising disks upon the sleeve and shaft relatively adjustable to cause engagement and release between said sleeve and drive shaft, means operable through the movement of the sleeve when said shaft and sleeve are driven together, to induce frictional contact between the disks on the sleeve and those on the shaft, means operable through the movement of the sleeve when it is freed from the shaft to induce frictional engagement between the disks on the shaft and the sleeve to retard the downward movement of the movable frame, and means operable through a yielding tension to induce a frictional tension between the sleeve and the disks on the drive shaft to turn said sleeve sufficiently to take up the slack of the flexible connection as the movable frame is gradually raised with the filling of a mold.

46. In a device of the class described, a vertically movable frame provided with tampers adapted to tamp material within a mold, means for operating said tampers, means for raising and lowering the movable frame comprising a drive shaft, a sleeve normally loose thereon, a flexible connection between the said sleeve and movable frame, disks on the shaft and sleeve, relatively adjustable to cause alternate engagement and release of said shaft and sleeve, whereby when the shaft and sleeve are engaged and the shaft driven, the movable frame will be raised, means actuated by the turning of the sleeve in the descent of the movable frame when said sleeve is disengaged from the drive shaft to induce a degree of frictional engagement between the disks on the shaft and the sleeve sufficient to retard the downward movement of the same.

47. In a device of the class described, a vertically movable frame provided with tampers adapted to tamp material within a mold, means for operating said tampers, means for raising and lowering the movable frame, comprising a drive shaft, a sleeve normally loose thereon, a flexible connection between the said sleeve and movable frame, disks on the shaft and sleeve relatively adjustable to cause alternate engagement and release of said shaft and sleeve whereby when the shaft and sleeve are engaged and the shaft driven, the movable frame will be raised, means actuated by the turning of the sleeve in the descent of the carriage when said sleeve is disengaged from the drive shaft to induce a degree of frictional engagement between the disks on the shaft and the sleeve sufficient to retard the downward movement of the same, and means to take up the slack of the flexible connection between the sleeve and the movable frame, comprising parts upon the sleeve actuated by spring tension between the same, to bear against the disk upon the drive shaft with sufficient force to induce a sufficient turning of the sleeve to take up the slack of the flexible connection as the movable frame is raised as the mold within which the tampers operate is gradually filled.

48. In a device of the class described, the combination of a main supporting frame provided with a drive shaft supported therein, a vertically movable frame provided with tamping members, means for operating the tamping members from the drive shaft, means for raising the movable frame intermittently connected with the drive shaft, means upon the sleeve and operated thereby when free to move independently of the drive shaft, to retard or brake the downward movement of the movable frame, a constantly driven member, interengageable clutch parts interposed between the constantly driven member and the drive shaft, a resilient member interposed between the clutch parts to hold them normally separated and means operable through the movement of the movable frame to cause engagement and release between said interengageable clutch members.

49. In a device of the class described, the combination of a main supporting frame provided with a drive shaft supported therein, a vertically movable frame provided with tamping members, means for operating the tamping members from the drive shaft, means for raising the movable frame comprising a sleeve intermittently connected with the drive shaft, means upon the sleeve and operated thereby when free to move independently of the drive shaft, to retard or brake the downward movement of the movable frame, a constantly driven member, interengageable clutch parts, one fixed upon the shaft and the other adjustably supported in connection with the constantly driven part, a lever connected with the movable clutch part and suitably supported upon the main framework and operable through the movement of the movable frame to cause alternate engagement and release of said interengageable clutch members and adjustable spring tension means connecting said lever with the main supporting frame to facilitate the regulation of the tension between said clutch parts.

50. In a device of the class described, the combination of a main supporting frame provided with a drive shaft therein, a vertically movable frame supporting tamping members, means for operating the tamping members from the drive shaft, means for raising and lowering the movable frame comprising a sleeve normally loose upon the drive shaft, disks upon the drive shaft, one fixed and one adjustable longitudinally thereof, disks upon the sleeve, a fixed part upon the shaft adjacent the movable disk, and a wedge held under variable spring tension and under the control of the operator adapted to shift the movable disk to cause said sleeve to be rotated with the shaft to raise the movable frame.

51. In a device of the class described, the combination of a main supporting frame provided with a drive shaft therein, a vertically movable frame supporting tamping members, means for operating the tamping members from the drive shaft, means for raising and lowering the movable frame comprising a sleeve normally loose upon the drive shaft, disks upon the drive shaft, one fixed and the other adjustable longitudinally thereof, disks upon the sleeve, a fixed part upon the shaft adjacent the movable disk, and a wedge held under variable spring tension and under the control of the operator adapted to shift the movable disk to cause said sleeve to be rotated with the shaft to raise the movable frame, and means upon the sleeve and operable through the movement thereof when free from the drive shaft to retard the downward movement of the movable frame.

52. In a device of the class described, the combination of a main supporting frame provided with a drive shaft thereon, a vertically movable frame supported therein, and carrying tamping members, means for operating the tamping members from the drive shaft, means for raising and lowering the movable frame from the drive shaft, a constantly driven member, interengageable parts between said constantly driven member and the drive shaft, means for alternately causing engagement and release between said parts, whereby the shaft may be turned or may be at rest, a yielding stop upon the stationary frame adapted to receive the upward thrust of the movable frame as it is raised, adapted to overcome the momentum thereof as it is released from the raising force, suitable ratchet and pawl parts between the drive shaft and the supporting frame adapted to prevent the shaft from turning rearwardly under the force of the cushion spring exerted upon the movable frame.

53. In a device of the class described, the combination with a main supporting frame provided with a drive shaft therein, a vertically movable frame carrying tamping members, means for operating the tamping members from the drive shaft, means for raising the movable frame comprising a sleeve connected with said movable frame by rope or chains, disks upon the drive shaft, one fixed and the other horizontally adjustable thereon, disks yieldingly connected with the sleeve, one upon each end for bearing relation with the disks on the drive shaft, means under the control of the operator for causing alternate interengagement and release between the disks on the drive shaft and the disks on the sleeve, whereby when the said disks are interengaged, the sleeve will be turned with the shaft to raise the movable frame and when released the sleeve will turn independently of the shaft as the movable frame descends.

54. In a machine of the class described, the combination of a main supporting frame provided with a drive shaft therein, a movable frame supported therein provided with a cross shaft, a plurality of eccentrics on said shaft placed thereon at different angles relatively, eccentric yokes embracing said eccentrics, a plurality of tamping bars pivotally connected with said yokes, guides for the tamping bars within said movable frame, means for operating the cross shaft of the movable frame from the drive shaft of the stationary frame, means for raising and lowering the movable frame comprising a sleeve turned in one direction by the engagement of the drive shaft and in the opposite direction by the weight of the movable frame, disks upon the drive shaft, one fixed and the other longitudinally adjustable thereon, disks upon the ends of the sleeve, means under the control of the operator for moving the adjustable disk into and out of engagement with the disk upon the sleeve to cause said sleeve to be alternately engaged with said shaft and then released therefrom, and means operable through the movement of the sleeve caused by the descent of the movable frame while the drive shaft is at rest, to frictionally retard the downward movement of the movable frame.

55. In a device of the class described, the combination of a main frame, a vertically movable frame supported therein provided with tamping members adapted to be reciprocated within a suitable mold, means for operating said tampers under the weight of the movable frame to tamp materials within the mold, a rotatable shaft in the main frame, means for raising the movable frame comprising an intermittently revoluble sleeve upon the shaft, a flexible connection between said sleeve and the movable frame, means for causing intermittent engagement between said shaft and sleeve, means for controlling the downward movement of the movable frame, comprising friction disks upon the sleeve, and drive shaft, and a part upon the sleeve operable through the movement of the descending movable frame to cause said disks to be forced into engagement sufficient to break the force of the descent of the movable frame.

56. In a device of the class described, the combination of a main frame, a vertically movable frame supported therein provided with tamping members adapted to be reciprocated within a suitable mold, means for operating said tampers under the weight of the movable frame to tamp materials within the mold, a rotatable shaft in the main frame, means for raising the movable frame comprising an intermittently revoluble sleeve upon the shaft, a flexible connection between said sleeve and the movable frame, means for causing intermittent engagement between said shaft and sleeve, means for controlling the downward movement of the movable frame comprising friction disks upon the sleeve and shaft relatively adjustable, and a part operable through the movement of the sleeve in the descent of the movable frame to cause said disks to be forced into sufficient engagement to retard the downward movement of the same, and means upon said sleeve operable when said sleeve is at rest or slowly turned to cause slight frictional engagement of disks upon the shaft and sleeve sufficient to take up the slack in the flexible connection as the movable frame is raised with the filling of the mold.

57. In a devise of the class described, the combination of a main frame, a vertically movable frame supported therein, a plurality of tamping bars within the movable frame, a drive shaft in the main frame, means for operating the tamping bars, means for raising the movable frame suitably connected with the sleeve upon the drive shaft, a flexible connection between the sleeve and the movable frame and parts upon the sleeve and shaft relatively adjustable to cause intermittent engagement therebetween to cause the turning of the former with the latter and means operable through the turning of the sleeve with the shaft to cause variable tension between the parts on the sleeve and shaft to retard the downward movement of the movable frame.

58. In a device of the class described, the combination of a main frame, a vertically movable frame supported therein, a plurality of tampers within the movable frame, a drive shaft in the main frame, means for operating the tampers from the drive shaft, means for raising the movable frame comprising a sleeve supported upon the drive shaft, a flexible connection between the sleeve and the movable frame, a movable disk upon the shaft, means under the control of the operator to cause said movable disk to engage the end of the sleeve, and means operable through the turning of the sleeve with the shaft to increase the frictional bearing between the movable disk on the shaft and the end of the sleeve as the shaft and the sleeve are revolved together.

59. In a device of the class described, the combination of a main frame, a vertically movable frame supported therein, a plurality of tampers within the movable frame, a drive shaft in the main frame, means for operating the tampers from the drive shaft, means for raising the movable frame comprising a sleeve supported upon the drive shaft, a flexible connection between the sleeve and the movable frame, a movable disk upon the shaft, means under the control of the operator to cause said movable disk to engage the end of the sleeve, and means operable through the turning of the sleeve with the shaft to increase the frictional bearing between the movable disk on the shaft and the end of the sleeve as the shaft and the sleeve are revolved together, and means operable by the turning of the sleeve when it is disengaged from the drive shaft, to retard the downward movement of the movable frame.

60. In a device of the class described, the combination of a main frame, a vertically movable frame supported therein, a plurality of tampers within the movable frame, a drive shaft in the main frame, means for operating the tampers from the drive shaft, means for raising the movable frame comprising a sleeve supported upon the drive shaft, a flexible connection between the sleeve and the movable frame, a movable disk upon the shaft, means under the control of the operator to cause said movable disk to engage the end of the sleeve, and means operable through the turning of the sleeve with the shaft to increase the frictional bearing between the movable disk on the shaft and the end of the sleeve as the shaft and sleeve are revolved together, and means operable by the turning of the sleeve when it is disengaged from the drive shaft, to retard the downward movement of the movable frame, and means for taking up the slack in the flexible connection between the sleeve and the movable frame comprising a part in the sleeve operable when the sleeve is at rest or slowly turned, to cause frictional engagement between the parts upon the sleeve and shaft to cause the slack in the flexible connection to be taken up as the movable frame is raised with the filling of the mold.

61. In a device of the class described, the combination with a main frame support and a vertically movable frame supported therein provided with friction reducing rollers thereon suitably placed to bear against frame uprights in the main frame, and with an eccentrically supported series of tampers supported upon the cross shaft therein, an intermittently frictionally operable driven shaft supported upon the main frame provided with adjustable friction disks thereon, a sleeve supported upon said shaft provided with friction disks yieldably connected therewith adapted for engagement with the disks upon the shaft and means for causing such engagement intermittently, flexible means between the said shaft and the vertically movable frame for raising the carriage through the movement of said shaft, and means connecting said shaft with the shaft in the carriage to cause the tampers to be operated, a suitable governor upon the periphery of one of the disks on the sleeve and provided with suitable arm extensions for bearing in connection with the adjustable disk upon the shaft.

62. In a device of the class described, the combination with a main frame support and a vertically movable frame supported therein provided with friction reducing rollers thereon suitably placed to bear against frame uprights in the main frame, and with an eccentrically supported series of tampers supported upon the cross shaft therein, an intermittently frictionally operable driven shaft supported upon the main frame provided with adjustable friction disks thereon, a sleeve supported upon said shaft provided with friction disks yieldably connected therewith adapted for engagement with the disks upon the shaft and means for causing such engagement intermittently, a pair of grooved spacing collars loose upon said shaft and a wedging lever operable in connection with the spacing collars to force them apart to cause the movable disk upon the shaft and the sleeve thereon to be moved lengthwise of the shaft to cause the engagement between the friction disks, flexible means between said shaft and the vertically movable frame for raising the carriage through the movement of said shaft, and means connecting said shaft with the shaft in the carriage to cause the tampers to be operated.

63. In a device of the class described, the combination with a main supporting frame and a vertically movable frame provided with a series of eccentrically supported tampers carried upon a cross shaft, of means for operating said tampers comprising an intermittently frictionally driven shaft, means held under spring tension and adjustable to varying tension to cause engagement between the frictional members connected with the source of power and the drive shaft and suitably positioned to be operated through the movement of the vertically movable frame to cause such frictional parts to be released automatically and means intermittently operable through the movement of the drive shaft to raise the movable frame and means actuated by the descent of the movable frame to retard its downward movement.

64. In a device of the class described, the combination with a main supporting frame and a vertically movable frame provided with a series of eccentrically supported tampers carried upon a cross shaft, of means for operating said tampers comprising an intermittently frictionally driven shaft, means held under spring tension and adjustable to varying tension to cause engagement between the frictional members connected with the source of power and the drive shaft and suitably positioned to be operated through the movement of the vertically movable carriage to cause such frictional parts to be released automatically, and means for raising said carriage comprising a sleeve upon the drive shaft and means connected with the sleeve and the shaft to facilitate intermittent frictional engagement between the same, flexible means connecting the sleeve with the carriage whereby as the sleeve is caused to be revolved by the shaft, the carriage will be raised.

65. In a device of the class described, the combination with a main supporting frame and a vertically movable frame provided with a series of eccentrically supported tampers carried upon a cross shaft, of means for operating said tampers comprising an intermittently frictionally driven shaft, means held under spring tension and adjustable to varying tension to cause engagement between the frictional members connected with the source of power and the drive shaft, and suitably positioned to be operated through the movement of the vertically movable carriage to cause such frictional parts to be released automatically, and means for raising said carriage, comprising a sleeve upon the drive shaft and means connected with the sleeve and the shaft to facilitate intermittent frictional engagement between the same, flexible means connecting the sleeve with the carriage, whereby as the sleeve is caused to be revolved by the shaft, the carriage will be raised, and means connected with the sleeve and operable through its revolution as the carriage is released to descend to cause a frictional brake upon the sleeve to prevent the carriage from descending too violently.

66. In a device of the character described, a tamping mechanism, means for carrying the same relatively to its work, lifting devices for said carrying means, driving means therefor, means permitting a disconnection of said lifting devices from said driving means, and an automatic governor to control the speed of said carrying means in its movement toward the work.

67. In a device of the class described, a tamping mechanism, means for carrying the same relatively to its work, power operated lifting means for said carrying means, a stopping device for said power-operated lifting means, and an automatic governor for controlling the speed of descent of said carrying means.

68. In a device of the class described, tamping mechanism, means for carrying said tamping mechanism relatively to its work, power-operated lifting means for said carrying means, an automatic governor actuating a device for controlling the speed of descent of said carrying means, and hand-operated means for operating said device.

69. In a device of the class described, a tamping mechanism carried by a sliding frame, an automatic governor to control the speed of said sliding frame in its downward movement, and a starting and stopping device for the machine adapted to stop the machine upon contact of the said sliding frame with said starting and stopping device.

70. In a device of the character described, a tamping mechanism, means for moving said tamping mechanism in relation to its work, driving means for said moving means, frictional engaging devices between said driving means and said moving means, and automatic governing mechanism for controlling the frictional engagement on the downward movement of said tamping mechanism.

71. In a device of the character described, tamping mechanism, means for carrying said tamping mechanism in relation to its work, driving means for said carrying means, an automatic governor to control the speed of the downward movement of said carrying means, and hand controlled governing means for said carrying means.

72. In a device of the character described, tamping mechanism, means for carrying said tamping mechanism in relation to its work, driving means for said carrying means, yielding connections between said carrying means and said driving means, and an automatic governor for controlling said yielding connections during the downward movement of said carrying means.

73. In a device of the character described, a fixed framework, a frame adapted to slide therein, a series of tamping bars carried by said sliding frame, automatic means for governing the speed of said sliding frame in its downward movement, and a hand controlled governing means adapted to supersede the automatic governing means at the will of the operator.

In testimony whereof I have affixed my signature, in presence of two witnesses.

GEORGE W. KRAMER.

Witnesses:
 LAURA E. CLAYPOOL,
 MARY E. COMEGYS.